3,231,503
AMMONIACAL AQUEOUS SOLUTION CONTAINING SODIUM CHLORITE AND USED FOR DISSOLVING METALS

Erich Laue, deceased, late of Watertown, Conn., by The Colonial Bank and Trust Company, executor, Waterbury, Conn., assignor to MacDermid, Incorporated, Waterbury, Conn., a corporation of Connecticut
No Drawing. Filed Jan. 30, 1964, Ser. No. 341,845
5 Claims. (Cl. 252—79.1)

This invention relates to the dissolution of metal coatings from various substrates, both metallic and non-metallic. A variety of ways are known for dissolving such metal coatings, most of these being subject to objections on grounds of economy, attack on substrates, waste disposal problems, or slow rates of reaction. It is an object of this invention to circumvent these difficulties.

The removal of copper coatings from substrates is one of the more commonly encountered industrial operations. Copper-stripping methods involving cyanides or chromic acid, although quite effective, are often impractical in areas where waste disposal is regulated by law as such cyanide and chromic acid solutions must be treated at considerable expense before the exhausted solutions can be discarded. It is an object of this invention to provide a practical copper-stripping solution entirely free of cyanide or chromic acid, thus obviating this problem.

Other known copper-stripping methods involving ferric chloride simplify the waste disposal problem to a degree, but do not permit economical recovery of the dissolved copper which is also necessary as the presence of the copper ion in the effluent is objectionable. It is accordingly a further object of this invention to permit recovery of the dissolved copper by simple neutralization.

Although this invention finds its primary application in the stripping of copper coatings from substrates, the teachings herein are equally applicable to brass and zinc, and to other metals such as cadmium and silver, although operative to a somewhat lesser extent as to such metals.

The stripping solution of the present invention comprises a chlorite, such as sodium chlorite, as an oxidant in an alkaline solution containing a complexing ion, more especially ammonium, as a complexing agent for the metal to be stripped.

Sodium chlorite is the material of choice as an oxidant because of its ready availability. Since the chlorite radical is the active portion of the molecule, however, other cations can be substituted for sodium.

The chlorite solution is operative for stripping within the alkaline range of pH 8 to 13. For purpose of better control, it is preferred to buffer the solution with an ammonium salt in the equivalent ratio of 1:2 relative to the hydroxide.

The preferred material for buffering the ammonium carbonate because of its minimal attack on a steel substrate, but ammonium salts containing other anions such as sulfate, nitrate, chloride will function effectively and are useful if the substrate is not attacked by such anions. This commonly is so in the stripping of non-metallic substrates used in the art of printed circuitry. Since ammonium carbonate is intrinsically unstable, the above-indicated stoichiometric relationship of the salt to the hydroxide can be achieved by using one mol of ammonium bicarbonate to 2 mols of ammonium hydroxide in accordance with the equation:

$$2NH_4OH + NH_4HCO_3 \rightarrow (NH_4)_2CO_3 + NH_4OH + H_2O$$

The stripping solution is not critical as to oxidant concentration, being operable from at least as little as 0.1 m./l. to near saturation. The preferred concentration is in the range of 0.35 to 0.4 mol/liter to permit solubility of the complexer. The concentration of the complexer is dependent upon the amount of copper or other metal to be dissolved, the complexer being present in excess over the copper in a mol ratio of at least 2:1. Larger excesses are preferred to compensate for volatility of the complexer.

As an example of the calculation involved in determining the amount of complexer, 0.375 m./l. of oxidant will oxidize 0.75 m./l. of copper to the cupric state. This cupric copper, acting as a secondary oxidant, will in turn oxidize another 0.75 m./l. of copper to the cuprous state, while being reduced itself to the cuprous condition. Therefore a total of 1.5 m./l. of copper will be oxidized, requiring a minimum of 3.0 m./l. of ammonium ion as a complexer. It may be pointed out here also that the cuprous copper at this stage is readily oxidized to the cupric state by atmospheric oxygen, and it then becomes capable itself of dissolving more copper if an excess of the complexer is present as an acceptor.

Operating temperature for the stripping solution is uncritical. Satisfactory results are obtained from below normal ambient room temperature to the boiling point of the ammonia in the foregoing concentration. However, it is generally desirable to maintain a temperature below about 30° C. until the primary oxidant is consumed to prevent its reaction with the complexer. Then, with cupric copper as the oxidant, the temperature can be increased to about 70° C. to continue the reaction. Although as mentioned, temperatures even above 70° C. are operative for the solution, ammonia volatilizes at an impractically rapid rate above that point.

When the solution is exhausted, the dissolved copper can be recovered simply by neutralizing the solution to a pH of 6 with sulfuric acid. Some prior dilution is generally desirable in this step. Copper will precipitate in the neutralized solution as basic copper carbonate which can be easily filtered and washed free of soluble alkali salts.

A number of examples are given below for purposes of illustration. Only a few of the possible modifications are specifically mentioned, and it is not the purpose of these examples to limit the scope of the invention. Agitation of the solution will, of course, accelerate the rates of reaction mentioned.

Example 1

An aqueous solution was prepared containing 0.375 m./l. of sodium chlorite, 3.0 m./l. ammonium hydroxide and 1.5 m./l. of ammonium bicarbonate. This solution dissolved copper at a rate of 0.00013 inch/minute at 25° C., without agitation.

Example 2

A solution prepared as in Example 1 dissolved zinc at a rate of 0.0001 inch-minute at 25° C. without agitation.

Example 3

A solution prepared as in Example 1 dissolved silver at a rate of 0.0004 inch/hour at 25° C. without agitation.

Example 4

An aqueous solution was prepared containing 0.375 m./l. of sodium chlorite, 4.5 m./l. of ammonium hydroxide and 2.25 m./l. of ammonium bicarbonate. This solution dissolved cadmium at the rate of 0.000037 inch/minute at 25° C., without agitation.

Example 5

A solution prepared as in Example 1 was employed in etching copper foil from a laminate printed circuit panel where the copper thickness was nominally 0.00134 inch, known in the trade as "1-ounce copper." The copper plate of the laminate panel was completely etched away in 11 minutes at 25° C., without agitation.

*Example 6*

A solution prepared as in Example 1 was exhausted with respect to the primary oxidant by the dissolution of 0.75 m./l. of copper, the solution having been operated at a temperature of 25° C. Thereafter the solution temperature was raised to 70° C., whereupon the solution continued to dissolve copper at a rate of 0.000117 inch/minute.

*Example 7*

A solution prepared as in Example 1 was exhausted with respect to the primary oxidant by the dissolution of 0.75 m./l. of copper. The solution was then diluted fourfold with water and sufficient sulfuric acid added to adjust the pH to 6.0 and maintained for four days. Analysis of the supernatant solution then showed that more than 99% of the dissolved copper had been precipitated.

What is claimed is:

1. A solution for dissolving metals of the class consisting of copper, zinc, brass, cadmium and silver, which consists essentially of an ammoniacal aqueous solution of sodium chlorite, wherein said chlorite is present in amount from about 0.1 m./l. to saturation and said solution has a pH of from 8 to 13.

2. A solution for dissolving metals of the class consisting of copper, zinc, brass, cadmium and silver, which consists essentially of sodium chlorite and ammonium hydroxide wherein the concentration of the sodium chlorite is from about 0.1 to 0.5 m./l. and said solution has a pH of from 8 to 13.

3. A solution as defined in claim 2, which further includes ammonium carbonate in equivalent ratio of 1:2 relative to ammonium hydroxide.

4. A solution as defined in claim 2, which further includes an ammonium salt in equivalent ratio of 1:2 relative to ammonium hydroxide.

5. A solution as defined in claim 2, wherein the concentration of the sodium chlorite is from 0.35 to 0.4 m./l.

References Cited by the Examiner

UNITED STATES PATENTS

| | | | |
|---|---|---|---|
| 1,657,666 | 1/1928 | Ellis | 75—2 |
| 1,798,607 | 3/1931 | Kardos | 204—146 |
| 1,867,527 | 7/1932 | Dunn | 204—146 |
| 2,457,234 | 12/1948 | Herbert et al. | 204—146 |
| 2,561,065 | 7/1951 | Meyer | 252—79.1 |
| 2,564,549 | 8/1951 | Stargardter | 156—18 |
| 2,581,490 | 1/1952 | Larsen | 204—146 |
| 2,588,566 | 3/1952 | Peaslee | 204—146 |
| 2,673,143 | 3/1954 | Du Fresne et al. | 156—22 |
| 2,727,818 | 12/1955 | Kenney et al. | 75—103 |
| 3,150,960 | 9/1964 | Hunter | 75—118 |

OTHER REFERENCES

Jackson et al.: Industrial and Eng. Chem., Anal. Ed., vol. 9, 1937, pp. 14–15.

DAVID L. RECK, *Primary Examiner.*

N. F. MARKVA, *Assistant Examiner.*